(12) United States Patent
de Ridder et al.

(10) Patent No.: US 6,649,048 B2
(45) Date of Patent: Nov. 18, 2003

(54) FILTER CARTRIDGE WITH REGULATED SURFACE CLEANING MECHANISM

(75) Inventors: Scott A. de Ridder, Portland, OR (US); James H. Lenhart, Jr., Portland, OR (US)

(73) Assignee: Stormwater Management, Portland, OR (US)

( * ) Notice: Subject to any disclaimer, the term of this patent is extended or adjusted under 35 U.S.C. 154(b) by 0 days.

(21) Appl. No.: 09/990,564

(22) Filed: Nov. 20, 2001

(65) Prior Publication Data
US 2003/0094407 A1 May 22, 2003

(51) Int. Cl.[7] .............................................. B01D 35/22
(52) U.S. Cl. ........................ 210/106; 210/119; 210/120; 210/123; 210/136; 210/170; 210/430
(58) Field of Search .................................. 210/106, 119, 210/120, 123, 170, 256, 429, 430, 436, 464, 472, 154, 155, 482, 266, 136, 264, 97, 109; 137/140; 405/129.1, 129.2, 129.45, 129.57, 129.85, 36–51

(56) References Cited

U.S. PATENT DOCUMENTS

| 414,240 A | 11/1889 | Norton |
| 556,725 A | 3/1896 | Farwell |
| 598,191 A | 2/1898 | Wilcox |
| 1,371,110 A | 3/1921 | Pelphrey |
| 2,609,932 A | 9/1952 | Fricke |
| 3,306,448 A | 2/1967 | Baker |
| 3,522,013 A | 7/1970 | Borgeson |
| 3,572,014 A | 3/1971 | Hansen |
| 3,674,687 A | 7/1972 | Quase |
| 3,747,303 A | 7/1973 | Jordan |
| 4,032,457 A | 6/1977 | Matchett |
| 4,135,908 A | 1/1979 | Widmer |
| 4,334,900 A | 6/1982 | Neumann |
| 4,338,106 A | 7/1982 | Mizuno et al. |
| 4,364,825 A | 12/1982 | Connor, Jr. |
| 4,427,542 A | 1/1984 | Glover |

(List continued on next page.)

OTHER PUBLICATIONS

"Removal of heavy metal from waste water—using dewatered and screened peat," *Agency of Ind. Sci. Tech.*, 1973.
"The Radial Filter," *Aero Mod*, May 1993.

*Primary Examiner*—Terry K. Cecil
(74) *Attorney, Agent, or Firm*—Kolisch Hartwell, P.C.

(57) ABSTRACT

A filter assembly that filters water, particularly stormwater, that includes flow regulating, siphon inducing, and surface cleaning features that allow the filter assembly to operate at the design filtration rate for an extended period of time. During filtration, water flows inward through an annular filter medium into a drain manifold. The rate of flow into the drain manifold is controlled by a float valve assembly. A check valve permits air to escape, but not enter, the filter assembly creating a siphon effect when the rate of flow into the drain manifold is increased. The siphon effect draws water through the entire filtration surface and the entire volume of the filter medium. When the external water level decreases to the level of an array of voids in the filter assembly enclosure, the siphon is interrupted by turbulent air streams entering the filter assembly, agitating the filter surface and dislodging particulate matter.

21 Claims, 5 Drawing Sheets

U.S. PATENT DOCUMENTS

| | | |
|---|---|---|
| 4,643,836 A | 2/1987 | Schmid |
| 4,829,045 A | 5/1989 | Fransham |
| 4,838,901 A | 6/1989 | Schmidt et al. |
| 4,976,873 A | 12/1990 | Ross |
| 5,085,266 A | 2/1992 | Arold et al. |
| 5,133,619 A | 7/1992 | Murfae et al. |
| 5,193,709 A | 3/1993 | Brassell |
| 5,223,154 A | 6/1993 | MacPherson, Jr. et al. |
| 5,294,337 A | 3/1994 | Johnson |
| 5,296,293 A | 3/1994 | Jobst |
| 5,297,367 A | 3/1994 | Sainz |
| 5,316,589 A | 5/1994 | Krieger, Jr. |
| 5,322,629 A | 6/1994 | Stewart |
| 5,330,651 A | 7/1994 | Robertson et al. |
| 5,391,295 A | 2/1995 | Wilcox et al. |
| 5,419,838 A | 5/1995 | DiTullio |
| 5,437,786 A | 8/1995 | Horsley et al. |
| 5,458,769 A | 10/1995 | Johannessen |
| 5,511,904 A | 4/1996 | Van Egmond |
| 5,549,817 A | 8/1996 | Horsley et al. |
| 5,573,349 A | 11/1996 | Paoluccio |
| 5,593,481 A | 1/1997 | Redner |
| 5,624,552 A | 4/1997 | Vales et al. |
| 5,624,576 A | 4/1997 | Lenhart et al. |
| 5,632,889 A | 5/1997 | Tharp |
| 5,683,577 A | 11/1997 | Nurse, Jr. |
| 5,707,431 A | 1/1998 | Verkaart et al. |
| 5,707,527 A | 1/1998 | Knutson et al. |
| 5,725,765 A | 3/1998 | Shen |
| 6,027,639 A | 2/2000 | Lenhart, Jr. et al. |
| 6,042,743 A | 3/2000 | Clemenson |
| 6,080,307 A | 6/2000 | Morris et al. |
| 6,099,723 A | 8/2000 | Morris et al. |
| 6,106,707 A | 8/2000 | Morris et al. |
| 6,143,172 A | 11/2000 | Rink et al. |
| 6,338,797 B1 * | 1/2002 | Nurse et al. |

* cited by examiner

FILTER CARTRIDGE WITH REGULATED SURFACE CLEANING MECHANISM

FIELD OF THE INVENTION

The invention relates to apparatus for the treatment of water, particularly stormwater, to reduce levels of contaminants such as garbage, sediment, heavy metals, oils and greases, organic toxins, and the like. Specifically, the invention provides a modular filter assembly that incorporates a regulated surface cleaning mechanism that is capable of using a wide variety of filtration materials to provide various levels of stormwater treatment.

BACKGROUND OF THE INVENTION

Stormwater is pure rainwater plus any particulate debris and dissolved materials that the rainwater carries along with it. In urban areas, rain that falls on the roofs of houses, collects on paved areas like driveways, roads and sidewalks is typically diverted through a system of pipes that is separate from the sewerage system. Unlike sewage, stormwater is not treated, but flows directly from streets and gutters into rivers, lakes and the ocean.

Stormwater can therefore be a form of diffuse or non-point source pollution. It can entrain pollutants, such as garbage, sediment, organic matter, heavy metals, and organic toxins, and flush them into receiving water bodies. As a consequence, natural bodies of water that receive stormwater may also receive pollutants capable of irreparable environmental harm.

The amount of stormwater pollution entering into such receiving bodies of water is related to the degree of urbanization in the surrounding area and the nature of the surrounding activities. Urbanization results in the covering of land with low-permeability structures, such as roadways, parking lots, and rooftops, which both generate large volumes of stormwater and accumulate pollutants. Since these types of surfaces do not allow rainfall to infiltrate, they allow the accumulated pollutants to be washed into stormwater drainage systems.

Prior to extensive human modification of the natural landscape, contaminated stormwater was not a significant problem. Rain fell on porous, natural surfaces where gradual percolation through the earth provided natural filtration before stormwater entered aquifers, streams, lakes, bays, and other natural water bodies. In addition, erosion due to excessive stormwater volumes was minimal and contaminants such as garbage, oil and grease, heavy metals, and organic chemicals were insignificant. In today's largely urban and industrial world, stormwater is a significant source of aquatic pollution.

In an effort to address the environmental problems posed by polluted stormwater, traps and filters for stormwater have been developed. U.S. Pat. No. 5,322,629 (hereby incorporated by reference) describes a method and apparatus for treatment of stormwater by vertical filtration through a bed of high-quality leaf compost material that removes pollutants prior to discharge into a receiving water body.

A granular form of compost that improves the overall performance of such filtration systems was described in U.S. Pat. No. 5,624,576 (hereby incorporated by reference). The permeability of a filter containing such granular compost is increased, and can be maintained for an extended period of time.

Extended filter permeability can be achieved by orienting the surface of the media bed vertically rather than horizontally, as described in U.S. Pat. No. 5,707,527 (hereby incorporated by reference). Vertical filter beds discourage the collection and storage of settled solids on the surface of the filter, which otherwise typically leads to "blinding" or surface loading, a rapid clogging of the outer surface of the filter. The use of a vertical filtration surface also facilitates the maintenance of the system both by keeping the bulk of the captured solids off of the media surface and by forcing the enclosure of the media into more manageable, engineered structures.

The improved filter apparatus described in U.S. Pat. No. 6,027,639 (hereby incorporated by reference) features a siphon-inducing mechanism and is somewhat "self-cleaning", thereby improving the operational life of the media bed. The filter apparatus of the '639 patent utilized a sealed upper housing that included a check valve for air evacuation within the housing. An induced siphon effect pulled stormwater through the filter until air was pulled through an air inlet along the lower perimeter of the housing, disrupting the siphon. It was intended that the air stream that resulted from such a siphon-breaking event would produce turbulence and thereby clean the filter. In particular, the filter apparatus of the '639 patent utilized a fabric filtration medium around the outside of the media bed to prevent particulates from clogging the media bed, and the periodic turbulence was intended to keep the fabric filter free of clogging particulates.

Unfortunately, although the filter basket of the '639 patent was an improvement over existing stormwater filter systems, it nevertheless possessed some shortcomings. The filter assembly typically featured a flush, circumferential air inlet along the lower perimeter of the filter housing. It was intended that the air stream resulting from the siphon-breaking event would be evenly distributed along the surface of the filter, producing turbulence and thereby cleaning the filter. In actual practice, however, the filter basket can only rarely be installed with perfectly horizontal alignment, and the air streams that result upon breaking the siphon are therefore typically concentrated along a single highest portion of the lower perimeter of the filter housing, and are highly localized at a single portion of the fabric filtration medium. The resulting localized air stream results in the cleaning of only a single section of the fabric filter medium, rather than the entire filter surface. Generally, these quick, uncontrolled, localized regions of turbulence typical of the previously described filter assemblies clean the outer surface of the filter less effectively than would a more prolonged and evenly distributed region of turbulence.

In addition, it was found that fabric filter media often suffered from rapid clogging. Filtered particulate matter could create rapid and persistent surface loading of the fabric filter, which was then exaggerated by the effects of a poorly functioning cleaning mechanism.

What is needed is a stormwater filter apparatus that 1) does not require the attachment or use of additional parts or material; 2) does not contribute additional mechanical complexity to the filter basket apparatus; 3) permits the induced siphon effect to be broken in a regulated and more distributed fashion that spreads the turbulent, scouring air stream along a greater portion of the outer surface of the filter medium; and/or 4) that can maintain high surface permeability while retaining large volumes of particulate matter before filtration capacity is significantly diminished.

SUMMARY OF THE INVENTION

The invention provides a filter assembly that includes a hood that incorporates a plurality of voids arranged in a horizontally-aligned array, a drain manifold, a filter medium between the hood and the drain manifold, a drainage space that is in fluid communication with both the filter medium and the drain manifold, a check valve in the hood that permits air to escape, but does not permit air to enter the drainage space, and a drain valve assembly that permits a first rate of fluid flow from the drainage space to the drain manifold until the drainage space fills with fluid to a specified depth, whereupon the drain valve assembly permits a second increased rate of fluid flow to the drain manifold. This second rate of fluid flow from the drainage space, acting in combination with the one-way check valve creates a siphon effect that draws additional fluid through the filter medium and out the drain manifold. This induced siphon effect continues until air is drawn under the hood through the plurality of voids, disrupting the siphon and restoring the first rate of fluid flow through the filter medium.

In one aspect of the invention, the filter assembly includes a cylindrical hood with a horizontally-aligned array of voids near the lower edge of the hood, a cylindrical drainage space placed concentrically within the hood, an annular water filtration medium between the hood and the drainage space that is in fluid communication with the drainage space, and a check valve in the hood that permits air to escape the filter assembly in response to rising stormwater within the hood but prevents air from entering the filter assembly.

The filter assemblies of the invention provide a float-actuated, siphonic, filter cartridge with a regulated surface cleaning mechanism for the filtration of water, particularly stormwater, before it is discharged. The design of the assembly of the invention facilitates the use of various filter mediums, offering flexibility in targeting a wide spectrum of pollutants. The regulated surface cleaning feature of the filter assembly effectively prevents surface loading of a majority of the outer filter surface, resulting in extended periods of useful service with minimal maintenance and without requiring an additional fabric filtration medium.

The advantages of the present invention will be understood more readily after a consideration of the drawings and the Detailed Description.

DETAILED DESCRIPTION OF THE PREFERRED EMBODIMENTS OF THE INVENTION

The filter assembly of the preferred embodiment of the invention typically includes a removable filter media basket with a vertically oriented filtration surface. The filter media basket itself is contained within an external upper housing, cover, or hood with a circumferential plurality of air inlets or voids located near its lower perimeter. The hood is designed to house, and facilitate the horizontal filtration of stormwater through, a bed of filtration material or filter medium. The media basket has a permeable outer screen and a permeable inner drainage space that collects the filtered water after it passes through the filter medium. The filter medium allows fluid communication between the outside environment and the inner drainage space. An effluent manifold, or drain manifold, connects to the drainage space via a bushing, which both allows the flow of treated stormwater out of the filter assembly and typically serves as a component of the float valve assembly. This bushing serves as the connection point between the cartridge and a containment structure that houses one or more filter assemblies of the invention.

Figure 1:
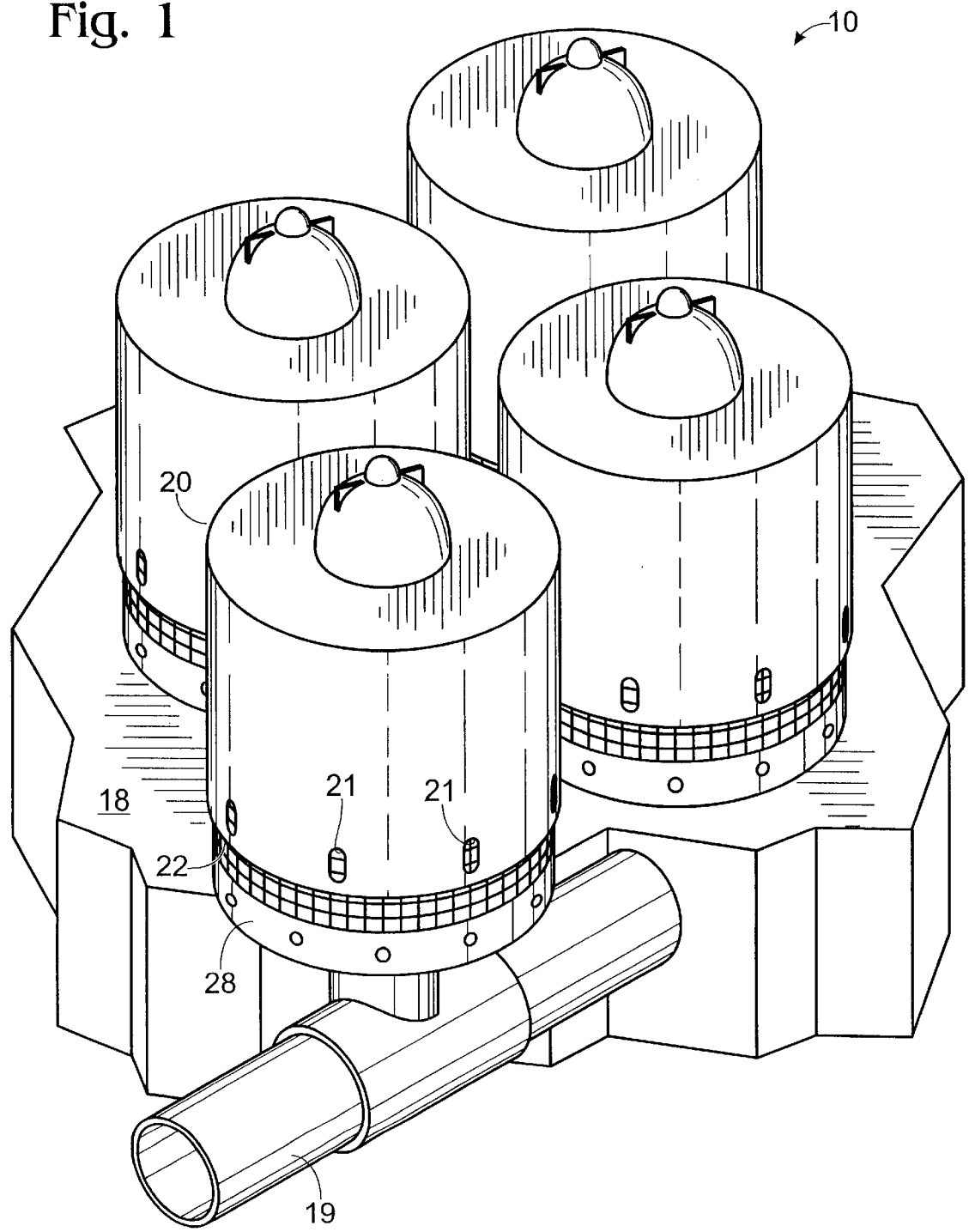
FIG. 1 is an isometric view of a manifold of filter assemblies of a first embodiment of the invention.

A manifold of filter assemblies 10 is shown in FIG. 1. The filter assemblies are typically housed in a containment structure 18 that is generally adapted to receive stormwater runoff from a stormwater drainage pipe, a parking lot, a street, or other surface. Typically, the containment structure includes a forebay that includes a storm water settling basin that facilitates settling of particulates and debris from the stormwater. The clarified stormwater overflows from the settling basin into a stormwater treatment zone where the filter assemblies of the invention are placed.

A given containment structure may contain only a single filter assembly, but more typically contains two or more filter assemblies. The drainage space of each filter assembly is in fluid communication with a drain manifold 19 that is generally embedded in the containment structure, as shown in FIG. 1. The drain manifold of each filter assembly typically leads to a common drainage conduit. The purified stormwater leaving the containment structure may be released into a receiving water body, or diverted to an additional treatment plant for further purification.

As discussed above, the filter assemblies of the invention incorporate a regulated surface cleaning mechanism. Although not typically required, the filter assembly may be periodically backflushed in order to remove debris entrapped within the filter medium that are not removed by the regulated mechanism, thereby restoring the infiltration capacity of the basket. Backflushing is typically achieved by preventing the outlet valve of the basket from opening, connecting a water hose to the drainage space, and flowing water at a high rate into the drainage space so that the water is forced to flow in reverse to the normal flow path during use, i.e., outward through the filter medium. The backflush water may then be collected, for example, by vacuum truck, and removed. Should the filter medium become irreversibly clogged, or lose chemical or biological potency, the modular nature of the filter medium basket allows it to be readily removed and replaced.

Figure 2:
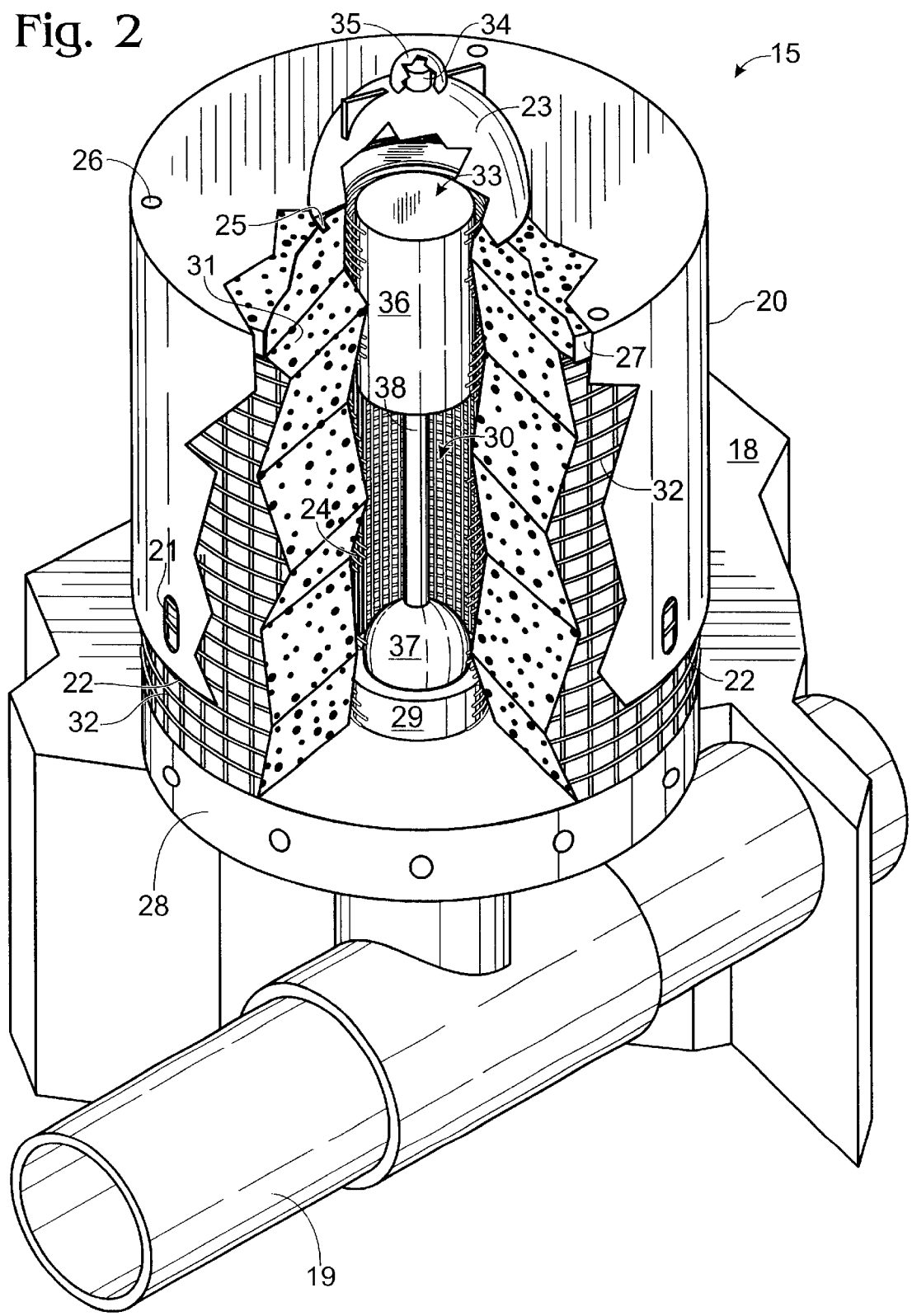
FIG. 2 is a partially sectioned isometric view of the first embodiment of FIG. 1.
Figure 3:
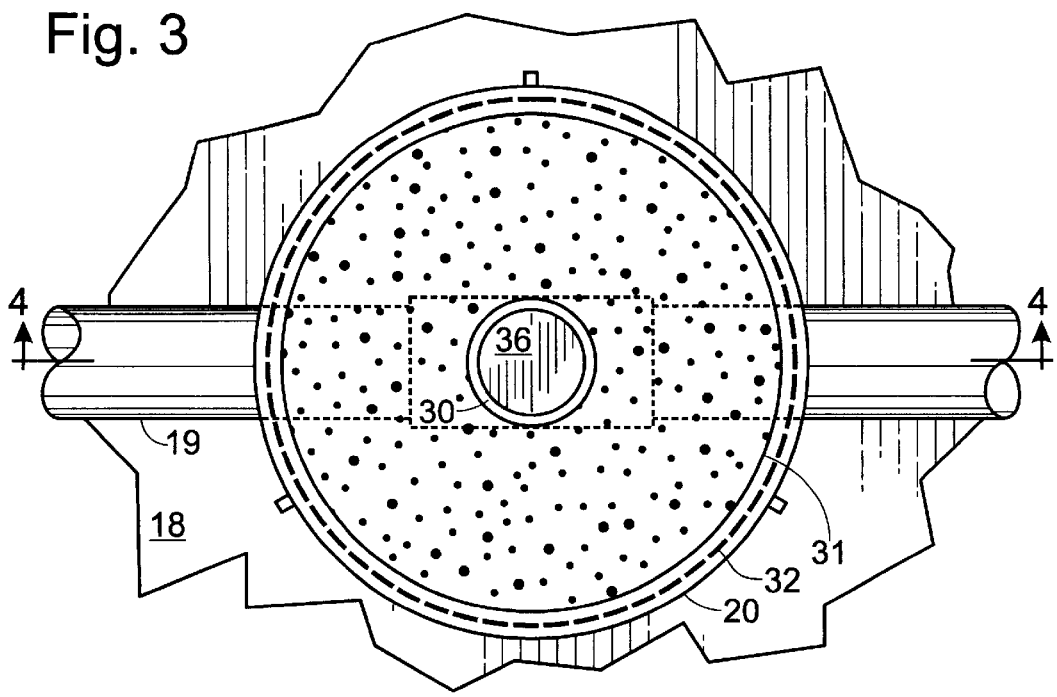
FIG. 3 is a sectional plan view of the embodiment of FIGS. 1 and 2 taken along line 3—3 of FIG. 4.
Figure 4:
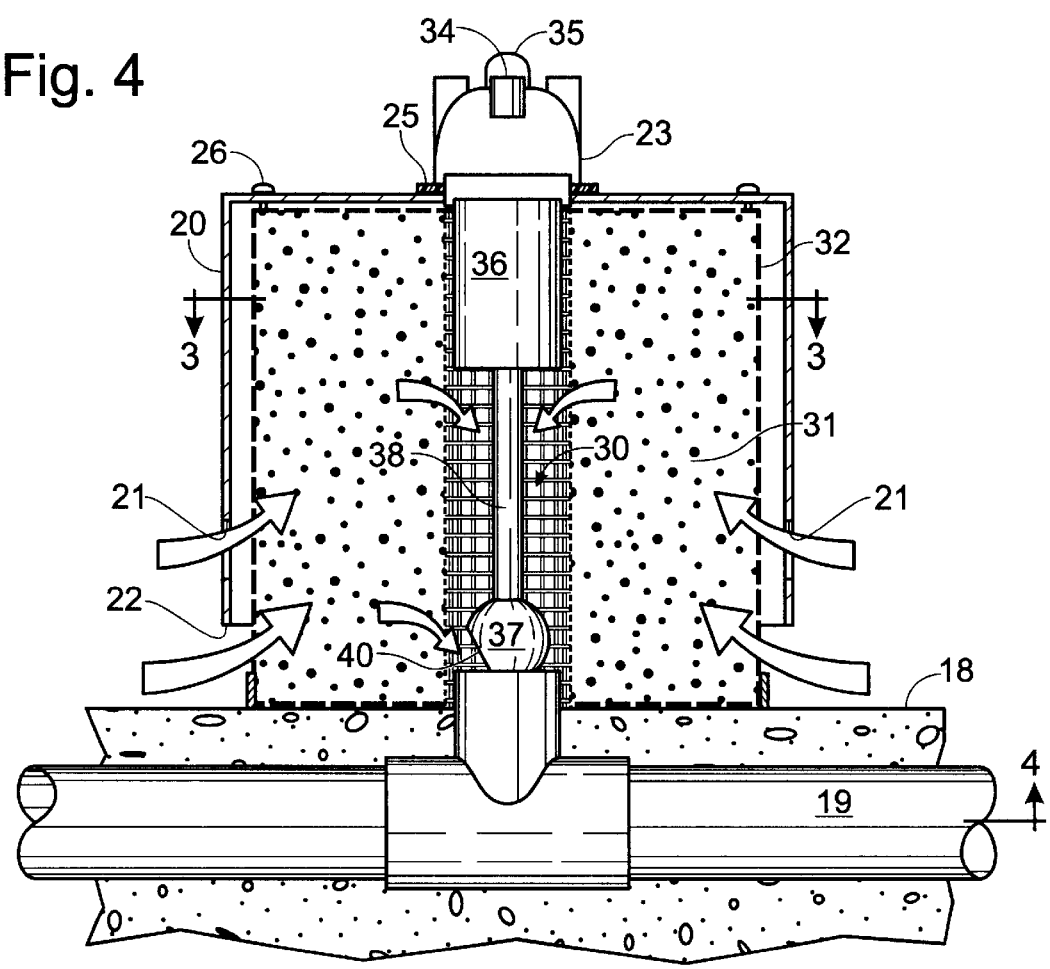
FIG. 4 is a side elevation sectional view of the embodiment of FIGS. 1–3, taken along line 4—4 of FIG. 3.

The filter assembly of the preferred embodiment at its most basic serves to channel stormwater through a filter medium, and facilitate efficient filtration of the stormwater. A filter assembly of the invention is shown in detail in FIGS. 2–4. The filter assembly 15 is defined and substantially enclosed by a hood 20 that includes a plurality of voids 21 that facilitate the regulated surface cleaning mechanism. The voids are arranged in a horizontally-aligned array within the material of the hood, preferably near a lower edge 22 of hood 20.

Hood 20 is attached to the filter assembly via an inner drainage space cap 23, which engages an upward-extending end of an inner drainage space screen 24, that extends through the center of hood 20. The connection between the inner drainage space cap 23 and the hood 20 is sealed through the use of a hood gasket 25 of an appropriate sealing material, such as neoprene rubber. Hood fasteners 26 are used to attach hood 20 to an outer screen support ring 27 to structurally reinforce the apparatus. The hood fasteners are seated against hood 20 so that an airtight seal is developed.

The components of the filter assembly are supported by a base 28 (a circular base in the case of a cylindrical filter assembly) of water-impermeable material, preferably plastic. This base 28 is seated over a bushing 29 that serves as the connection point between the filter assembly and the drain manifold 19, this bushing 29 being in fluid communication with the inner drainage space 30, that is in turn in fluid communication with a filter medium 31 that is disposed in an annular space surrounding the inner drainage space 30. The filter medium is bounded by an outer screen 32 that is connected to the base 28 and supported at its upper extremity by the outer screen support ring 27, and inner drainage space screen 24 that defines the inner drainage space.

The drain manifold 19 incorporated in the cartridge containment structure 18 connects vertically to the base of the inner drainage space 30 via the bushing 29, which both allows the flow of treated stormwater out of the cartridge and serves as a component of a float valve assembly 33. This bushing serves as the connection point between the filter assembly 15 and the containment structure 18. The inner drainage space cap 23 contains a mechanism to promote the development of a siphon by permitting air to be expelled from beneath the hood but preventing air from flowing back into the housing via the inner drainage space cap 23. This mechanism is typically one of a variety of one-way check valve designs. In a preferred embodiment, check valve 34 is an umbrella-type check valve that is installed atop the inner drainage space cap 23 and shielded by a perforated check valve cap 35.

The filter assembly generally relies on hydraulic pressure to force water through the filter medium and the filter assembly is therefore at least partially submerged in stormwater during normal operation. As shown by the arrows in FIG. 4, stormwater enters the filter assembly, infiltrates radially inward through the outer screen 32 and filter medium 31, and into the inner drainage space 30 for removal via the drain manifold 19. Filtration occurs as the water is strained through, and comes into contact with, the filter medium.

The filter medium or media are selected to efficiently remove contaminants by physical filtration. Additionally, the filter medium or media may be selected to remove contaminants through chemical action, biological action, or by any suitable combination thereof. In one aspect of the invention, a screen such as outer screen 32 is a satisfactory physical filter without the presence of additional filter media. In this embodiment of the invention, the filter assembly is capable of high throughput, rapidly screening debris from large volumes of stormwater. In another embodiment, the filter includes outer screen 32 and one or more types of filter medium that is selected for finer filtration, for appropriate chemical reactivity, or appropriate biological activity. Mixtures of different media types are optionally used to provide advantageous combinations of filtering ability.

In one aspect of the invention, the filter medium is selected to remove heavy metals, oils and greases, organic toxins, and other contaminants that stormwater typically accumulates when flowing over paved areas in residential or industrial communities before entry into a stormwater drainage system. In another aspect of the invention, the filter medium is selected to remove total or dissolved phosphorous or nitrogen from stormwater. Selected media include, without limitation, organic compost, vermiculite, activated carbon, peat, zeolite, perlite, diatomaceous earth, clay minerals, commercial ion exchange resins, catalyst-infused resins, silica sand, iron-infused media, or mixtures of these. In one aspect of the invention, the filter medium is in the form of granules or pellets. Large granules provide the advantage of maintaining a high flow rate through the treatment bed by minimizing clogging of the bed that might otherwise arise from the accumulation of fine particulate debris. Alternatively, fine granules provide enhanced filtration of fine debris. The selection of pellet or granule size depends on the desired level of physical straining and treatment.

Although not typically preferred, the filter assembly optionally includes a cloth or paper filter, including pleated filters. The use of a cloth or paper filter either outside of or within the filter medium basket may be used to capture extremely fine particulates during filtration.

The flow of filtered water into the drain manifold is controlled by a float valve assembly 33 that includes a buoyant float 36, a float valve body 37, and a linkage 38 joining the float to the float valve body. Bushing 29 contains an orifice against which the float valve body 37 seats. The float valve assembly 33 impedes the passage of water via the bushing 29 when the float valve assembly is in its first, or lower, position.

Float valve body 37 is typically designed such that the seal between it and the bushing 29 is imperfect and causes the float valve assembly to leak. This is accomplished through a variety of modifications to either the float valve body 37 or bushing 29 such that a perfect seal between the bushing and the float valve assembly is not possible. In one embodiment, imperfections in the float valve body due to manufacturing processes result in sufficient fluid flow into the drain manifold for the purposes of the invention. Where the float valve body is manufactured to higher tolerances, a notch or depression may be formed in bushing 29 that prevents a watertight seal. In a more preferred embodiment, a slight relief 40 may be molded into float valve body 37 to prevent a perfect seal against bushing 29. Relief 40 may be a notch in the float valve body, or simply a flat spot in the otherwise spherical surface of the float valve body. Any relief mechanism that provides sufficient fluid flow into the drain manifold is an adequate relief mechanism for the purposes of the invention.

When float valve assembly 33 is in the normal (lower) position, stormwater entering the filter assembly displaces air beneath the hood 20 through check valve 34 that is in fluid communication with the inner drainage space 30. Float valve body 37 does not block the flow of fluid into the drain manifold, but restricts the flow of fluid into the drain manifold to a first (slow) rate of fluid flow. This first rate of fluid flow insures that the containment structure does not accumulate standing water, such as may create a health hazard. Even a small amount of water in the containment structure is filtered and flows into the drain manifold. However, during an increase in stormwater flows, for example due to sudden or severe rainfall, the filter assembly of the invention utilizes an additional filtration mechanism.

During periods of increased flow, stormwater accumulates in the containment structure faster than the first rate of filtration can accommodate, and the level of stormwater in the containment structure increases. When the level of fluid within the hood increases to a predetermined depth during filtration, the buoyancy of float 36 causes float valve assembly 33 to lift valve body 37 free of bushing 29 and thereby permits a second increased rate of fluid flow from inner drainage space 30 into drain manifold 19. As the flow of fluid into the drain manifold increases beyond the rate of fluid flow into the inner drainage space, a negative air pressure inside the filter assembly is created, and one-way check valve 34 closes. As outside air cannot enter the hood of the filter assembly via the check valve, a standing column of water is established beneath the hood, drawing stormwater through the entirety of the filter medium as filtered water leaves by way of the drainage space 30.

In one embodiment of the invention, the filter assembly does not include a float valve assembly. In this aspect of the invention, the rate of fluid flow into the drain manifold is determined by selection of an appropriately sized opening into the drain manifold. Filtration occurs as described above, and the siphon effect is created when the rate of fluid flow from the inner drainage space into the manifold is greater than the rate of fluid flow from the containment structure into the filter assembly, thereby creating a negative pressure beneath the hood and closing the check valve.

Once established, the siphon effect continues to draw stormwater through the filter assembly until the water surface elevation outside the hood drops to the level of the surface cleaning regulation voids 21 located along lower perimeter 22 of hood 20. At this point, the pressure differential between the outside and the inside of the hood causes outside air to be drawn beneath the hood to equalize the pressure, disrupting or "breaking" the siphon.

The horizontally-aligned voids 21 along the lower perimeter 22 of the hood 20 direct and regulate the size of the air streams that turbulently rise in the space between the hood and filter medium 31. In particular, these turbulent air streams agitate outer screen 32 and the surfaces of the filter medium 31 and dislodge particulate matter that has accumulated on these surfaces during filter operation. This dislodged particulate matter is then flushed from beneath the hood and allowed to settle onto the floor of containment structure 18, where it is stored until it is removed at a suitable maintenance interval. By cleaning the surface of outer screen 32 and the outer surfaces of filter medium 31, the turbulent air streams prevent surface loading and maintain the high surface permeability of the filter medium.

As the siphon effect is disrupted, the water surface elevation beneath the hood drops to the vicinity of the lower perimeter of the hood 20. At this point float valve body 37 re-seats itself against bushing 29 and the entire filter assembly returns to the first, reduced rate of water filtration.

As the filter assembly of the invention employs a strategic array of voids, rather than simply employing a circumferential slot, lip, or skirt, the turbulent air streams that result from disrupting the siphon can more or less be regulated in terms of their distribution and force. The resulting regulated air streams lasts longer and are of a more consistent energy, thus both avoiding potentially damaging localized air stream surges and maximizing the distribution of the surface cleaning action. A further benefit to the present design is the flexibility to adjust the character of the air streams through the selective manipulation of void size, shape, and distribution.

Figure 5:
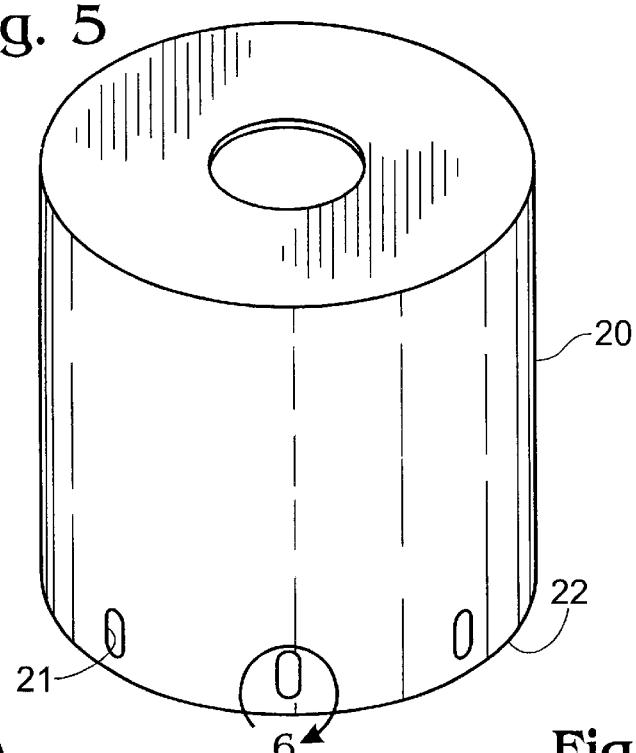
FIG. 5 is an isometric view of a filter hood of the embodiment of FIGS. 1–4, including surface cleaning regulation voids.

The surface cleaning regulation voids 21 are horizontally-aligned relative to each other, and the horizontal alignment is parallel to lower edge 22 of hood 20, as shown in FIG. 5.

The number and spacing of surface cleaning regulation voids 21 can be adjusted to regulate the distribution and energy of the siphon-breaking air streams.

The particular shape of the surface cleaning regulation voids 21 are chosen to provide the desired combination of aperture size, onset of air flow, ease of manufacture, and other characteristics. Useful shapes for the surface cleaning regulation voids of the invention include, but are not limited to, circular, triangular, rectangular, or any other shape that substantially regulates the intake of air when the external water level reaches the level of the surface cleaning regulation voids. Examples of surface cleaning regulation voids are shown in FIGS. 6A–6H.

Figure 6A:
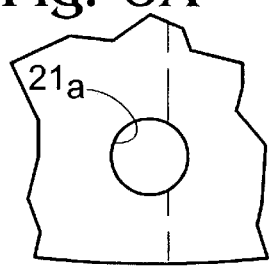
FIGS. 6A–6H are fragmentary side elevation view of the alternative surface cleaning regulation void shapes in accordance with the invention.
Figure 6B:
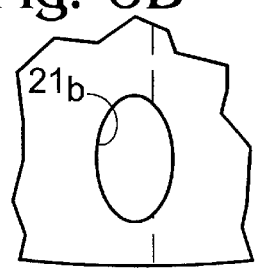
Figure 6C:
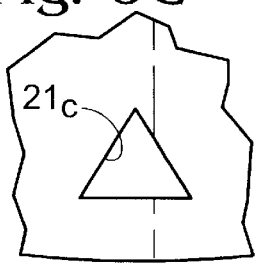
Figure 6D:
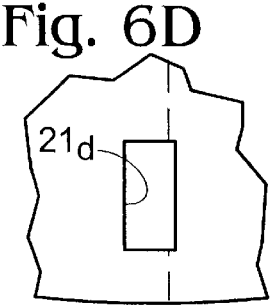
Figure 6E:
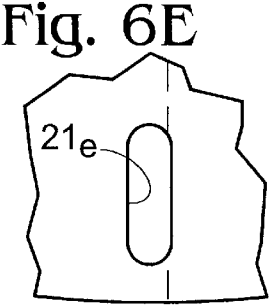
Figure 6F:
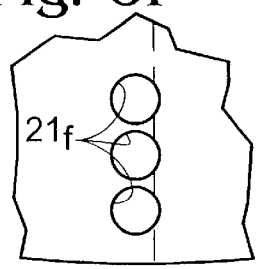
Figure 6G:
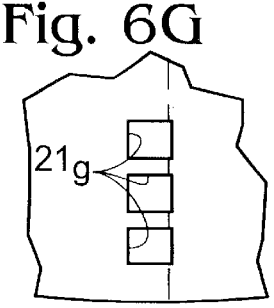
Figure 6H:
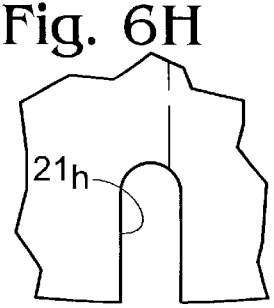

In one embodiment of the invention, the surface cleaning regulation void 21 overlaps and extends across the lower edge of the hood 20, forming a vertical slot as shown in FIG. 6H. More preferably, each surface cleaning regulation void 21 is placed very close to the lower perimeter of the hood 22 without overlapping its edge, this arrangement constituting the best combination of functionality and ease of construction without compromising the structural integrity of hood 20 (as shown in FIGS. 6A–6G). Each surface cleaning regulation void is optionally defined by a plurality of smaller voids that are preferably arranged in a vertically-aligned array (as shown in FIGS. 6F and 6G). In a preferred configuration each surface cleaning regulation void 21 is vertically elongate with rounded ends, as shown in FIG. 6E.

FIG. 5 depicts a filter assembly hood 20 with a plurality of surface cleaning regulation voids 21 installed near the lower edge 22 of the hood. The voids are typically mechanically punched into the hood, which is preferably of plastic, such that each surface cleaning regulation void extends completely through the hood material. Alternatively, each surface cleaning regulation void is formed during the casting or molding of the hood.

Figure 7:
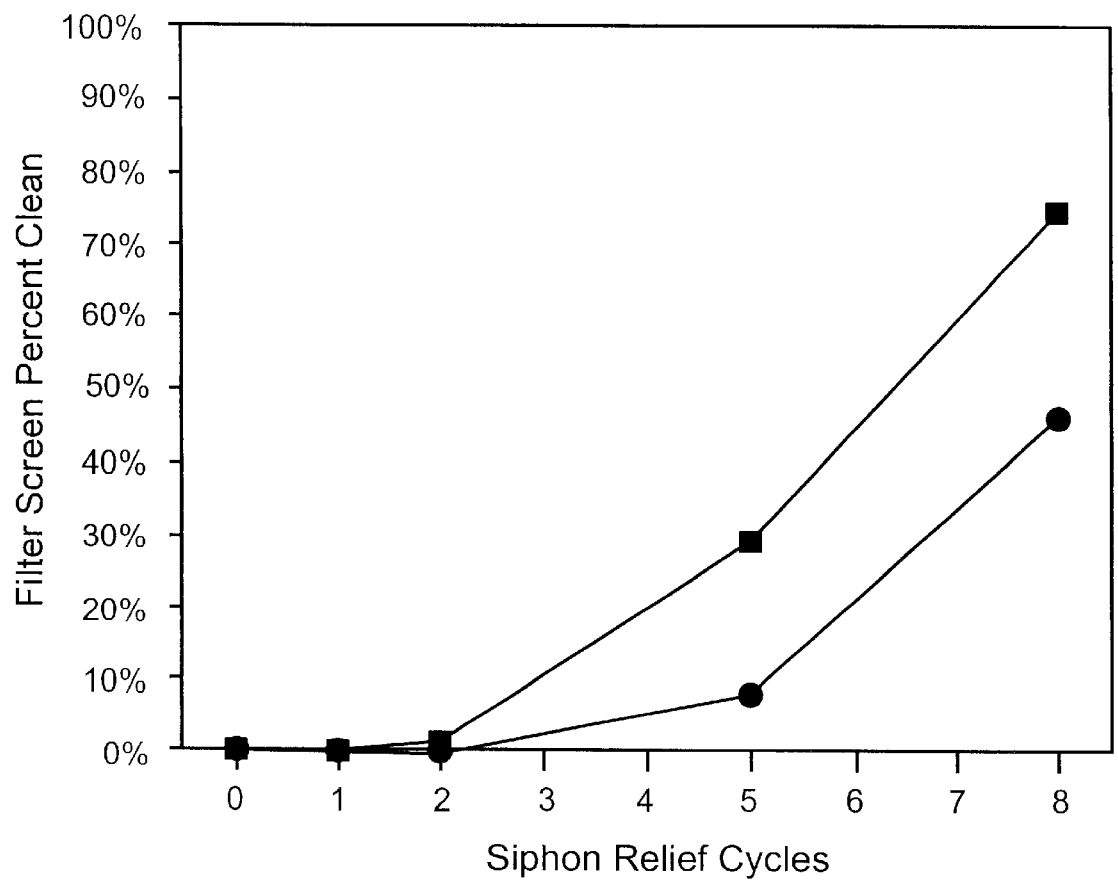
FIG. 7 is a plot showing the relative filter cleaning efficiency of a filter assembly having a hood with surface cleaning regulation voids (■) compared to a hood without such voids (●).

The filter assemblies of the invention clean the surfaces of their filters more efficiently than previously described filter assemblies, due to the effect of the surface cleaning regulation voids in the filter assembly hood. The cleaning efficiency of the surface cleaning regulation voids was evaluated by marking the surface of a filter screen with a grid pattern, and covering the surface with a semi-soluble paste. The obstructed screen was then placed in a filter assembly with either a conventional filter assembly hood or a hood that contained surface cleaning regulation voids. The ability of the turbulence associated with the siphon relief event to remove the paste was monitored by counting the percentage of the filter screen openings that were 100% clean after a specified number of siphon relief cycles. Average values for several runs are plotted for both the modified and unmodified filter hoods, as shown in FIG. 7. The filter hood that incorporated surface cleaning regulation voids exhibited substantially more efficient surface cleaning ability than the filter hood without the voids.

The filter assemblies of the invention provide significant advantages over previously described massive, horizontal bed units in terms of ease of maintenance, space required, and service life, primarily on account of the modular design of the overall filter apparatus. Instead of a single, monolithic bed of media that must be completely serviced on site, the filter assemblies and used filter media can be quickly removed for off-site service and immediately replaced. Thus, rather than requiring a large workforce to service the system in place, the service of the filter basket and media can be performed at an off-site facility. In terms of space requirements, the use of the instant filter assemblies result in a greater area of filter surface within a given horizontal area than can be produced using a horizontal bed, which in turn increases service life by increasing the potential of surface loading capacity. Service life is further increased since the surface of the filtration media is vertically oriented, thus avoiding the storage of filtered debris on the sensitive filter surface. Additionally, the siphon-induced, surface cleaning mechanism also prolongs the lifetime of the filter medium. Thus the instant stormwater filters are easier to maintain, provide a greater amount of filter surface area per unit of horizontal space, and resist surface loading longer than horizontal bed units.

Although the present invention has been shown and described with reference to the foregoing operational principles and preferred embodiments, it will be apparent to those skilled in the art that various changes in form and detail may be made without departing from the spirit and scope of the invention. For example, the invention is not limited to cylindrical filter assemblies having radial water flow, but includes filter assemblies having a variety of shapes and filter configurations, including square, rectangular, or semicircular filter assemblies. The drainage space is not limited to being configured within the filter medium, but may be located on the opposite side of a generally planar filter medium from the stormwater inlets in the filter hood. A variety of mechanisms may function as one-way check valves, and a variety of valve mechanisms exist for metering the flow from the drainage space into the drain manifold. The present invention is intended to embrace all such alternatives, modifications and variances which fall within the scope of the appended claims.

What is claimed is:

1. A filter assembly comprising:
   a hood that defines a plurality of voids arranged in a horizontally-aligned array;
   a drain manifold;
   a filter disposed between the hood and the drain manifold;
   an inlet configured below the hood for inputting fluid to be filtered;
   a drainage space that is disposed between and in fluid communication with both the filter and the drain manifold; and
   a check valve that is configured to permit air to escape but not to enter the drainage space, such that a siphon can be established that draws additional fluid through the filter and into the drain manifold, the siphon continuing until air entering the hood via the plurality of voids disrupts the siphon.

2. The filter assembly of claim 1, further comprising a drain valve assembly within the drainage space, the drain valve assembly configured to permit a first rate of fluid flow from the drainage space to the drain manifold until the drainage space is filled with fluid to a specified depth, whereupon the drain valve assembly permits a second increased rate of fluid flow to the drain manifold, the second rate of fluid flow acting in combination with the siphon to draw additional fluid through the filter and into the drain manifold, and where disruption of the siphon restores the first rate of fluid flow.

3. The filter assembly of claim 1, where the filter is selected to remove contaminants by physical filtration.

4. The filter assembly of claim 3, where the filter is a filter screen.

5. The filter assembly of claim 3, where the filter further comprises a filter medium selected to remove contaminants by chemical action, biological action, or by a combination thereof.

6. The filter assembly of claim 5, where the filter medium comprises a granular substance.

7. The filter assembly of claim 1, where the drainage space is cylindrical in shape, and the filter surrounds the drainage space in an annular fashion.

8. The filter assembly of claim 1, where the hood has a lower horizontal edge, and each void is disposed near the lower edge of the hood.

9. The filter assembly of claim 8, where each void is vertically elongate and does not overlap with the lower edge of the hood.

10. The filter assembly of claim 1, where each void is circular, oval, triangular, or rectangular in shape.

11. The filter assembly of claim 1, where each void is vertically elongate with rounded edges.

12. The filter assembly of claim 1, where the filter further comprises a fabric filter.

13. The filter assembly of claim 1, where the air entering the hood via the plurality of voids creates turbulence in a region between the hood and the filter that cleans the surface of the filter.

14. A filter assembly for removing pollutants from stormwater, comprising:
   a cylindrical hood having a lower edge, the hood incorporating a horizontally-aligned array of voids near the lower edge;
   a cylindrical drainage space disposed concentrically within the hood;
   a filter, disposed between the hood and the drainage space, and in fluid communication with the drainage space;
   an inlet configured below the hood for inputting stormwater to be filtered: and
   a check valve in the hood, configured to permit air to escape the filter assembly in response to rising stormwater within the hood, but to prevent air from entering the filter assembly,
   wherein said filter assembly is configured such that a siphon can be established that draws additional stormwater through the filter and into the drainage space, the siphon continuing until air entering the hood via the array of voids disrupts the siphon.

15. The filter assembly of claim 14, where the filter comprises a cylindrical screen that physically filters the stormwater.

16. The filter assembly of claim 15, where the filter further comprises a granular filter medium selected to remove contaminants by physical filtration.

17. The filter assembly of claim 16, where the filter further comprises a granular filter medium selected to remove contaminants from the stormwater by chemical action, biological action, or by a combination thereof.

18. The filter assembly of claim 14, where each void is vertically elongate with rounded edges and does not overlap the lower edge of the hood.

19. The filter assembly of claim 14, further comprising:
   a drain manifold that is in fluid communication with the drainage space;
   a drain valve disposed between the drainage space and the drain manifold, the drain valve configured to partially or completely restrict water flow from the drainage space into the drain manifold and thereby moderate the water flow through the filter; and
   a float assembly comprising a buoyant float within the drainage space and a linkage connecting the float to the drain valve, the float assembly configured so that when the drainage space fills with water to a determined depth, the float assembly rises and fully opens the drain valve to permit increased water flow from the drainage space into the drain manifold.

20. The filter assembly of claim 19, where the increased water flow from the drainage space into the drain manifold establishes a siphon effect that draws additional stormwater through the filter and into the drainage space, the siphon effect continuing until air entering the hood via the array of voids disrupts the siphon effect, lowers the float assembly, and restricts water flow from the drainage space into the drain manifold.

21. The filter assembly of claim 20, where air entering the hood via the array of voids creates turbulence in a region between the hood and the filter, dislodging particulate matter that has accumulated on the filter.

\* \* \* \* \*